US012651495B2

(12) United States Patent
Lee

(10) Patent No.: US 12,651,495 B2
(45) Date of Patent: Jun. 9, 2026

(54) STORAGE DEVICE, AND SENSOR SYSTEM AND VEHICLE INCLUDING THE SAME

(71) Applicant: Samsung Electronics Co., Ltd., Suwon-si (KR)

(72) Inventor: Seungcheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 18/738,571

(22) Filed: Jun. 10, 2024

(65) Prior Publication Data

US 2025/0201043 A1     Jun. 19, 2025

(30) Foreign Application Priority Data

Dec. 14, 2023     (KR) ........................ 10-2023-0182164

(51) Int. Cl.
| | |
|---|---|
| *G01S 13/56* | (2006.01) |
| *G01S 7/35* | (2006.01) |
| *G01S 13/524* | (2006.01) |
| *G01S 13/89* | (2006.01) |
| *G01S 17/89* | (2020.01) |
| *G06F 3/06* | (2006.01) |
| *G07C 5/08* | (2006.01) |

(52) U.S. Cl.
CPC .............. G07C 5/085 (2013.01); G01S 7/356 (2021.05); G01S 13/5246 (2013.01); G01S 13/89 (2013.01); G01S 17/89 (2013.01); G06F 3/0679 (2013.01)

(58) Field of Classification Search
CPC .......... G01S 13/56; G01S 13/546; G01S 7/41; G01S 7/35
See application file for complete search history.

(56) References Cited

U.S. PATENT DOCUMENTS

| | | |
|---|---|---|
| 11,567,777 B2 | 1/2023 | Navon et al. |
| 11,644,834 B2 | 5/2023 | Ditty et al. |
| 11,693,562 B2 | 7/2023 | Kale et al. |
| 11,693,566 B2 | 7/2023 | Lee |
| 2019/0258251 A1 | 8/2019 | Ditty et al. |
| 2021/0072901 A1 | 3/2021 | Kale et al. |
| 2021/0333386 A1* | 10/2021 | Park ........................ G01S 7/356 |
| 2022/0011423 A1* | 1/2022 | Li ........................... G01S 7/023 |
| 2022/0147282 A1 | 5/2022 | Navon et al. |
| 2022/0206109 A1 | 6/2022 | Ikram et al. |
| 2022/0269422 A1 | 8/2022 | Lee |

(Continued)

FOREIGN PATENT DOCUMENTS

| | | |
|---|---|---|
| WO | 2023/048793 A1 | 3/2023 |

OTHER PUBLICATIONS

Extended European search report issued Mar. 5, 2025 in European Application No. 24202686.2.

*Primary Examiner* — Tan Q Nguyen

(74) *Attorney, Agent, or Firm* — Fish & Richardson P.C.

(57) ABSTRACT

A vehicle storage device according to at least one embodiment includes: a first interface configured to transmit a first signal to an object, and to receive first data generated by analog to digital converting a second signal reflected and returned to the object outside a vehicle; a radar pre-processor configured to generate second data by performing a pre-processing operation on the first data; a second interface configured to output the second data; and a non-volatile memory configured to store the first data.

20 Claims, 9 Drawing Sheets

(56)                References Cited

U.S. PATENT DOCUMENTS

| | | | |
|---|---|---|---|
| 2022/0342039 A1 | 10/2022 | Eschbaumer et al. | |
| 2023/0044883 A1 | 2/2023 | Muchherla et al. | |
| 2023/0168367 A1* | 6/2023 | Rosu .................... | H04B 7/0413 |
| | | | 342/93 |
| 2023/0236314 A1 | 7/2023 | Jin et al. | |
| 2023/0258767 A1* | 8/2023 | Nashimoto .......... | G01S 13/584 |
| | | | 342/17 |
| 2023/0305111 A1 | 9/2023 | Youn et al. | |
| 2024/0255633 A1* | 8/2024 | Govinda Kammath ..................... | |
| | | | G01S 7/415 |
| 2024/0319332 A1* | 9/2024 | Shalita ................. | G01S 13/881 |
| 2025/0004095 A1* | 1/2025 | Kishigami ............. | G01S 7/354 |
| 2025/0189626 A1* | 6/2025 | Filippi ..................... | G01S 7/35 |

* cited by examiner

FIG. 9

STORAGE DEVICE, AND SENSOR SYSTEM AND VEHICLE INCLUDING THE SAME

CROSS-REFERENCE TO RELATED APPLICATION

This application claims priority to and the benefit of Korean Patent Application No. 10-2023-0182164 filed in the Korean Intellectual Property Office on Dec. 14, 2023, the entire contents of which are incorporated herein by reference.

BACKGROUND

(a) Field

The present disclosure relates to a storage device, a sensor system, and a vehicle including the storage device and sensor system.

(b) Description of the Related Art

An advanced driver assistance system (ADAS) is an assisting system that supports driving with the purpose of improving driver safety and convenience and avoiding dangerous situations. The ADAS may measure surrounding environments using sensors mounted inside and/or outside the vehicle. For example, the sensors used by the ADAS may include one or more cameras, one or more infrared ray sensors, one or more ultrasonic wave sensors, one or more LIDAR (Light Detection and Ranging) sensors, one or more radar (radio detecting and ranging) sensors, and/or the like.

Meanwhile, as the level of autonomous driving of vehicles increases, many sensors with high bandwidths are being applied. Therefore, to process data measured by the sensors, communication technology that guarantees high bandwidths is required.

SUMMARY

At least one embodiment of the present disclosure provides a vehicle storage device including: a first interface configured to receive first data, the first data generated by digitally converting an analog signal transmitted to and reflected by an object outside a vehicle; a non-volatile memory configured to store the first data; a radar pre-processor configured to generate second data by performing a pre-processing operation on the first data; and a second interface configured to output the second data.

Another embodiment of the present disclosure provides a vehicle sensor system including: at least one RADAR sensor configured to transmit a first signal to an object, and to generate first data based on a second signal reflected back from the object outside a vehicle; a storage device configured to receive the first data from the at least one RADAR, and to perform a pre-processing operation on the first data to generate second data; and a central controller configured to obtain information on the object based on the second data.

Another embodiment of the present disclosure provides a vehicle including: a RADAR sensor configured to transmit a RADAR transmitting signal to an object outside a vehicle, to receive a reflected signal reflected back from the object, and to analog-to-digital convert the reflected signal to generate RADAR raw data; a storage device configured to store the RADAR raw data and to generate RADAR data by performing a pre-processing operation on the RADAR raw data; a central controller configured to obtain information on the object based on the RADAR data; and an electronic control unit (ECU) configured to control driving of the vehicle based on information on the object.

BRIEF DESCRIPTION OF THE DRAWINGS

FIG. 9 shows a block diagram of a vehicle according to at least one embodiment.

DETAILED DESCRIPTION OF THE EMBODIMENTS

Figure 1:
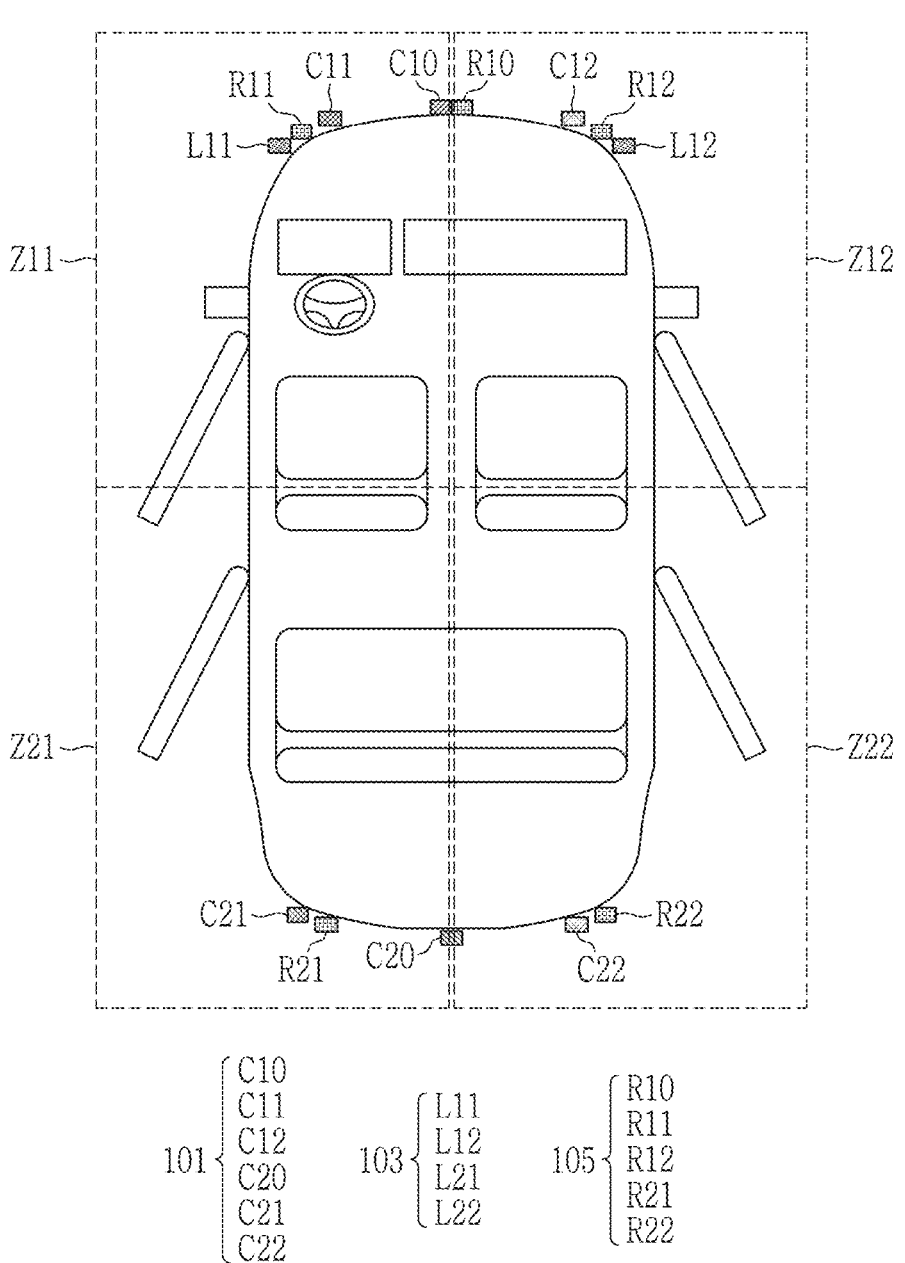
FIG. 1 shows a vehicle according to at least one embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive, and like reference numerals designate like elements throughout the specification. In the flowcharts described with reference to the drawings, the operation order may be changed, various operations may be merged, certain operations may be divided, and certain operations may not be performed. Additionally, in the present specification, functional elements and/or device, including units that have and/or configured to have at least one function or operation such a "functional device", "controller" and/or " . . . unit", may be implemented with processing circuitry including hardware, software, or a combination of hardware and software. For example, the processing circuitry more specifically may include, but is not limited to, a central processing unit (CPU), a neural processing unit (NPU), a graphics processing unit (GPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

An expression recited in the singular may be construed as singular or plural unless the expression "one", "single", etc., is used. Terms including ordinal numbers such as first, second, and the like, will be used only to describe various components, and are not to be interpreted as limiting these components. The terms may be only used to differentiate one component from others.

FIG. 1 shows a vehicle according to at least one embodiment.

Referring to FIG. 1, the vehicle 10 may include sensors. For example, the sensors may include at least one of image sensors 101, light detection and ranging (LIDAR) sensors 103, and/or radio detecting and ranging (RADAR) sensors 105. The present disclosure is not limited thereto, and the sensors may further include various sensors (e.g., a corner radar, a rear-view camera, a side-view camera, etc.,) configured to obtain environmental information around the vehicle 10.

The respective sensors may be configured to sense environments around the vehicle 10. For example, the respective sensors may sense other vehicles, pedestrians, obstacles, bicycles, lanes, road signs, curbs, guard rails, street trees, and streetlamps, and/or the like.

The image sensors 101 may include a plurality of image sensors, such as a first image sensor C10 configured to sense a field of view facing a front center side of the vehicle 10, a second image sensor C11 configured to sense a field of view facing a front left, a third image sensor C12 configured to sense a field of view facing a front right, a fourth image sensor C20 configured to sense a field of view facing a rear center side, a fifth image sensor C21 configured to sense sensing a rear left, and/or a sixth image sensor C22 configured to sense a rear right. The respective image sensors 101 may be and/or include, e.g., cameras, and may film directions in which the image sensors 101 are installed, and may thus obtain image data. The image data may include, e.g., position information on other vehicles, pedestrians, obstacles, bicycles, lanes, road signs, curbs, guard rails, street trees, streetlamps, and/or the like.

The LIDAR sensors 103 may include a plurality of LIDAR sensors, such as a first LIDAR sensor L11 facing a front left of the vehicle 10, a second LIDAR sensor L12 facing a front right, a third LIDAR sensor L21 facing a rear left, and/or a fourth LIDAR sensor L22 facing rear right. The respective LIDAR sensors 103 may be configured to irradiate laser pulses with a specific frequency to an object as transmitting waves, to measure a time of receiving reflecting waves from the object, and to measure a distance with the object. Thus, the respective LIDAR sensors 103 may obtain LIDAR data based on the transmitting waves and the reflecting waves. The LIDAR data may include distance information on the object.

The RADAR sensors 105 may include a plurality of RADAR sensors, such as a first RADAR sensor R10 with a field of sensing facing the front of the vehicle 10, a second RADAR sensor R11 with a field of sensing facing the front left, a third RADAR sensor R12 with a field of sensing facing the front right, a fourth RADAR sensor R21 with a field of sensing facing the rear left, and a fifth RADAR sensor R22 with a field of sensing facing the rear right. The respective RADAR sensors 105 may include a transmit antenna for radiating RADAR transmitting signals at a position where the RADAR sensors 105 are installed and a receive antenna for receiving RADAR receiving signals reflected to the object. Thus, the respective RADAR sensors 105 may obtain RADAR raw data based on the RADAR transmitting signal and the RADAR receiving signal. The RADAR raw data may be data generated by analog-digital converting the RADAR receiving signal.

The vehicle 10 may include a plurality of zones, e.g., Z11, Z12, Z21, and Z22. The vehicle 10 may further include a zone controller for the respective zones Z11, Z12, Z21, and Z22. The zone controller may control inputs to and/or outputs from functional devices and sensors relating to the respective zones of the vehicle 10. It will be assumed hereinafter that one central controller controls the zones Z11, Z12, Z21, and Z22. However, the example embodiments are not limited thereto, and a zone controller may be provided for each of the respective zones Z11, Z12, Z21, and Z22 and/or for combinations of the respective zones Z11, Z12, Z21, and/or Z22.

The first zone Z11 may include the functional device and the sensor(s) disposed on the front left of the vehicle 10. For example, the first zone Z11 may include a second image sensor C11, a first LIDAR sensor L11, and a second RADAR sensor R11.

The second zone Z12 may include the functional device and the sensor(s) disposed on the front right of the vehicle 10. For example, the second zone Z12 may include a third image sensor C12, a second LIDAR sensor L12, and a third RADAR sensor R12.

The third zone Z21 may include the functional device and the sensor(s) disposed on the rear left of the vehicle 10. For example, the third zone Z21 may include a fifth image sensor C21, a third LIDAR sensor L21, and a fourth RADAR sensor R21.

The fourth zone Z22 may include the functional device and the sensor(s) disposed on the rear right of the vehicle 10. For example, the fourth zone Z22 may include a sixth image sensor C22, a fourth LIDAR sensor L22, and a fifth RADAR sensor R22.

The first image sensor C10 and the first RADAR sensor R10 may be included in the first zone Z11 or the second zone Z12. The fourth image sensor C20 may be included in the third zone Z21 or the fourth zone Z22.

FIG. 1 shows that the vehicle 10 includes four zones. However, the examples are not limited thereto, and the vehicle 10 may include two zones (e.g., front/rear or left/right), three zones (e.g., front left/front right/rear), and/or may include more zones.

Figure 2:
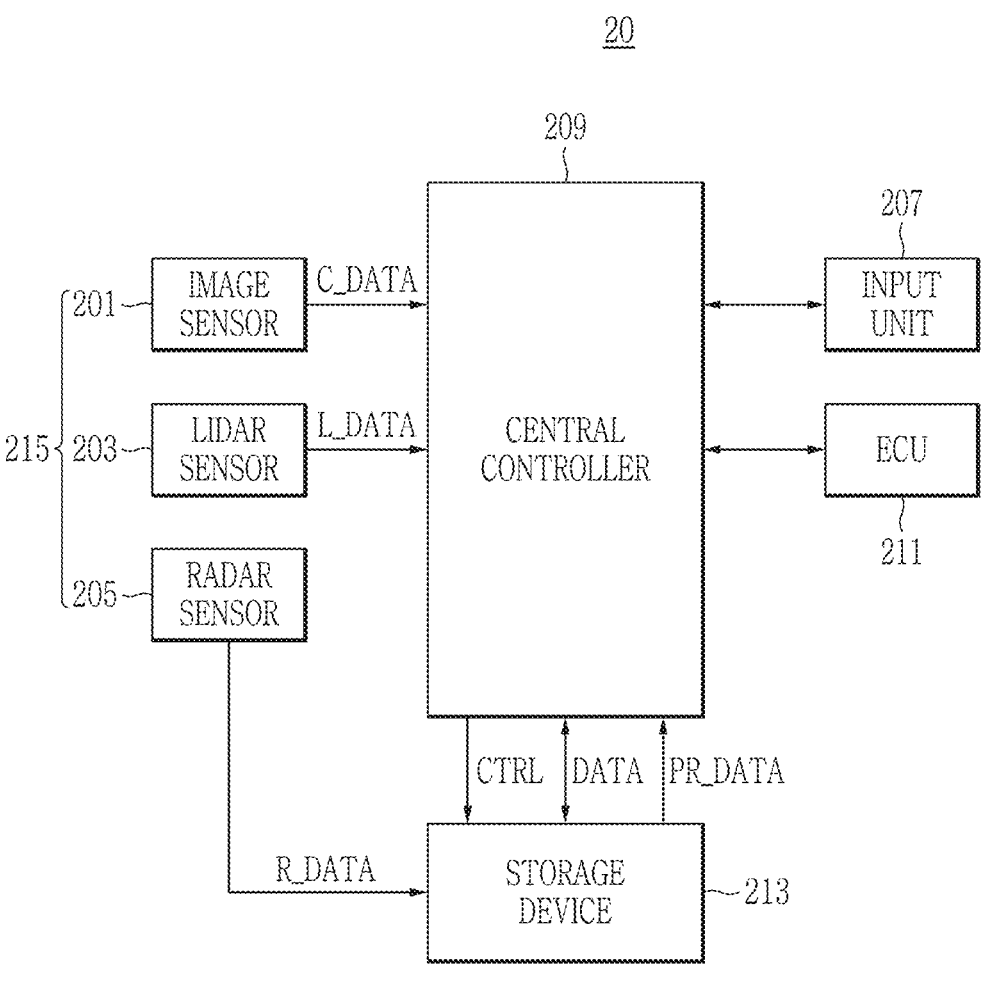
FIG. 2 shows a configuration of a vehicle according to at least one embodiment.

FIG. 2 shows a configuration of a vehicle according to at least one embodiment.

As shown in FIG. 2, the vehicle 20 may include a sensor portion 215 and a functional device portion. The functional device portion may include, e.g., an input section 207, a central controller 209, an electronic control unit (ECU) 211, and a storage device 213.

In at least one embodiment, the vehicle 20 may include an advanced driver assistance system. For example, the advanced driver assistance system may provide lane departure warning (LDW), lane keeping assist (LKA), high beam assist (HBA), autonomous emergency braking (AEB), traffic sign recognition (TSR), smart cruise control (SCC), blind spot detection (BSD), forward collision-avoidance assist (FCA), and/or the like.

The sensor portion 215 may include a plurality of sensors configured to obtain environmental information, e.g., an image sensor 201, a LIDAR sensor 203, and/or a RADAR sensor 205.

The image sensor 201 may obtain image data (C_DATA) around the vehicle 20. The image sensor 201 may transmit the image data (C_DATA) to the central controller 209. The central controller 209 may process the image data (C_DATA) to sense the object included in the image data (C_DATA), to obtain motion information about the object, etc.

The LIDAR sensor 203 may obtain LIDAR data (L_DATA) on the object around the vehicle 20. The LIDAR sensor 203 may transmit the LIDAR data (L_DATA) to the central controller 209. The central controller 209 may obtain distance information, relative motion information, etc., by processing the LIDAR data (L_DATA).

For example, the LIDAR sensor 203 may include a light emitter and a light receiver. The light emitter may emit light and the light receiver may receive the light reflected back from an object. In at least one embodiment, the light emitter may emit infrared laser beams. The light receiver may receive light in a predetermined direction from among reflecting light generated when the light—emitted by the light emitter—is reflected from the object. For example, the light receiver may include a condensing lens for collecting the received light and a photo-sensor for detecting the received light. In at least one embodiment, the light receiver may include an amplifier for amplifying the light detected by the photo-sensor. The LIDAR sensor 203 may generate LIDAR data based on the light received by the light receiver.

The RADAR sensor 205 may obtain RADAR raw data (R_DATA) on the object around the vehicle 20. The RADAR sensor 205 may transmit the RADAR raw data (R_DATA) to the storage device 213. In at least one embodiment, the RADAR raw data (R_DATA) may be data generated by digitally converting an analog signal transmitted to and reflected by an object. For example, RADAR sensor 205 may transmit a first signal (e.g., an analog radio based signal), may receive a second signal (e.g., the analog signal reflected from an object), convert the second signal to the RADAR raw data (R_DATA) using an analog-to-digital conversion, and then transmit the RADAR raw data (R_DATA) to the storage device 213.

In at least one embodiment, the RADAR sensor 205 may include an array antenna. The RADAR sensor 205 may transmit RADAR transmitting signals and may receive RADAR receiving signals through the array antenna. The array antenna may include antenna elements. According to at least one embodiment, array antenna may be configured as a multiple input multiple output (MIMO) through the antenna elements. In this instance, the antenna elements may form MIMO channels. For example, the channels that correspond to (M×N)-numbered virtual antennas may be formed through the M-numbered transmit antenna elements and the N-numbered receive antenna elements. Here, the RADAR receiving signals received through the respective channels may have different phases in receiving directions.

In at least one embodiment, the RADAR sensor 205 may be configured to generate frequency modulated (FM) signals, e.g., for which the frequency changes with respect to time, as laser transmitting signals. For example, the RADAR sensor 205 may frequency-modulate a chirp signal of which an amplitude linearly changes (e.g., increases and/or reduces) with respect to time into a frequency modulated signal. The frequency modulated signal may have the frequency that corresponds to the amplitude of the chirp signal. The RADAR sensor 205 may transmit the frequency modulated signal as a laser transmitting signal, and may receive a RADAR receiving signal that is reflected and returned after the transmitted signal reaches the object. A frequency difference between the RADAR receiving signal and the transmitted RADAR transmitting signal may be proportional to the distance between the RADAR sensor 205 and the object. The RADAR sensor 205 may generate RADAR raw data (R_DATA) based on the RADAR receiving signal reflected and returned from the object and the transmitted RADAR transmitting signal. For example, the RADAR raw data (R_DATA) may include the value obtained by digitally converting the RADAR receiving signal.

The RADAR sensor 205 may use an electromagnetic wave that has different wavelengths depending on the purposes thereof as a RADAR transmitting signal. For example, the RADAR sensor 205 disposed in front of the vehicle 20 may use the electromagnetic wave with a long wavelength as the RADAR transmitting signal. When the RADAR sensor 205 uses a low-frequency electromagnetic wave with a long wavelength as a RADAR transmitting signal, the attenuation of the radio wave is small, which may increase the detection distance, but it is difficult to identify objects smaller than the wavelength, which may lower the resolution. Meanwhile, for example, the disposed RADAR sensor 205 disposed on a lateral side of the vehicle 20 may use the electromagnetic waves with short wavelengths as the RADAR transmitting signal. When the RADAR sensor 205 uses high frequencies with a short wavelength as a RADAR transmitting signal, resolution increases, but attenuation may occur due to absorption or scattering by dust and/or moisture in the air, clouds, etc.

The input section 207 may receive and/or sense various inputs of a user. The input section 207 may include, for example, at least one of a touch sensor and/or a physical button, lever, or knob provided to respective displays in the vehicle 20. For example, the input section 207 may include at least one physical button such as a button for turning on/off various functions and/or a button for changing setting values of the various functions.

The central controller 209 may process the data sensed by the sensor portion 215. For example, the central controller 209 may measure environments of the vehicle 20 based on data sensed by the sensor portion 215. The central controller 209 may obtain information on the object disposed outside the vehicle. The central controller 209 may generate control signals for controlling the vehicle 20 based on the measured environments, for example, information on the object. The central controller 209 may control the ECU 211 so that the vehicle 20 may drive according to the control signal.

The central controller 209 may receive image data (C_DATA) from the image sensor 201 and/or LIDAR data (L_DATA) from the LIDAR sensor 203. The central controller 209 may receive RADAR data (PR_DATA) from the storage device 213.

The central controller 209 may detect positions of objects disposed around the vehicle 20, distances to the objects, and speeds of the objects based on the RADAR data (PR_DATA), the image data (C_DATA), and/or the LIDAR data (L_DATA).

In at least one embodiment, the central controller 209 may transmit a control signal (CTRL) to be stored in the storage device 213 and data (DATA) to be written thereto to the storage device 213. For example, the data (DATA) to be written may include information on positions of the objects disposed on a road on which the vehicle 20 drives, and positions and speeds of the objects disposed around the vehicle 20.

In at least one embodiment, the central controller 209 may transmit a control signal (CTRL) for reading data (DATA) to the storage device 213. The storage device 213 may transmit data (DATA) that correspond to the control signal (CTRL) for the read operation to the central controller 209.

The ECU 211 may be configured to control the driving of a driving device of the vehicle 20. For example, the driving device may include a safety device and a detecting device in the vehicle 20. In at least one embodiment, the ECU 211 may control the driving of the vehicle 20 based on the control signal generated by the central controller 209.

The storage device 213 may receive raw data from the sensor, and may generate pre-processed data based on the received raw data. For example, the storage device 213 may receive RADAR raw data (R_DATA) from the RADAR sensor 205, and may generate pre-processed RADAR data (PR_DATA) based on the received RADAR raw data (R_DATA). FIG. 2 shows that the storage device 213 receives RADAR raw data (R_DATA) from the RADAR sensor 205, however, the present disclosure is not limited thereto, and the storage device 213 may also receive image data from the image sensor 201 and/or may receive LIDAR data from the LIDAR sensor 203. When receiving image data from the image sensor 201, the storage device 213 may generate pre-processed image data based on the received image data. When receiving LIDAR data from the LIDAR sensor 203, the storage device 213 may generate pre-processed LIDAR data based on the received LIDAR data.

In at least one embodiment, the RADAR data (PR_DATA) may include point cloud data on surroundings of the vehicle 20. The point cloud data may include position information on the objects disposed on the surroundings of the vehicle. The storage device 213 may transmit the RADAR data (PR_DATA) to the central controller 209.

The storage device 213 may receive a control signal (CTRL) (for instructing storing in the storage device 213) and data (DATA) to be written to the storage device 213 from the central controller 209. The storage device 213 may receive a control signal (CTRL) for instructing reading from the central controller 209. The storage device 213 may transmit the data (DATA) read from the storage device 213 to the central controller 209 in response to the receiving of the control signal (CTRL) for instructing reading.

The storage device 213 may store image data (C_DATA) of the image sensor 201 and LIDAR data (L_DATA) of the LIDAR sensor 203. The storage device 213 may store processing results on the image data (C_DATA), the LIDAR data (L_DATA), and the RADAR data (PR_DATA) by the central controller 209.

The sensor portion 215, the input section 207, the central controller 209, the ECU 211, and the storage device 213 may communicate with each other through a communication network for vehicles. For example, the sensors portion 215 and the functional devices may transmit/receive data through the Ethernet, the media oriented systems transport (MOST), the Flexray, the controller area network (CAN), the local interconnect network (LIN), and/or the like.

FIG. 2 shows that the vehicle 20 includes the image sensor 201, the LIDAR sensor 203, and the RADAR sensor 205, the present disclosure is not limited thereto, and as described with reference to FIG. 1, the vehicle 20 may include the image sensors, the LIDAR sensors, and the RADAR sensors.

Figure 3:
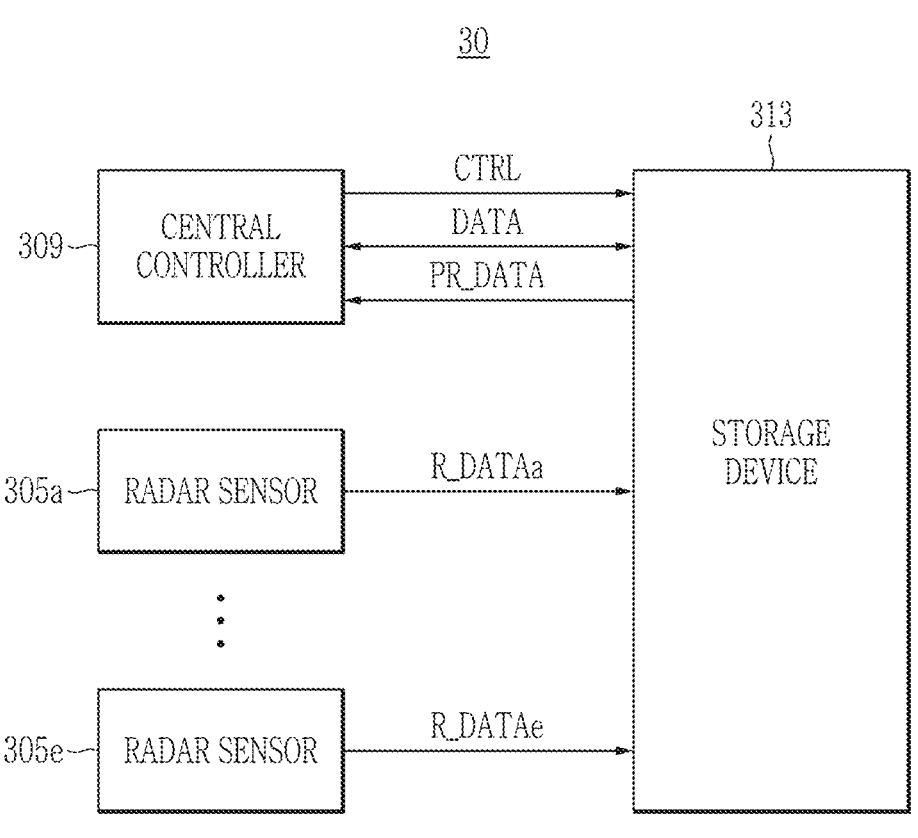
FIG. 3 shows a partial configuration of a vehicle according to at least one embodiment.
Figure 4:
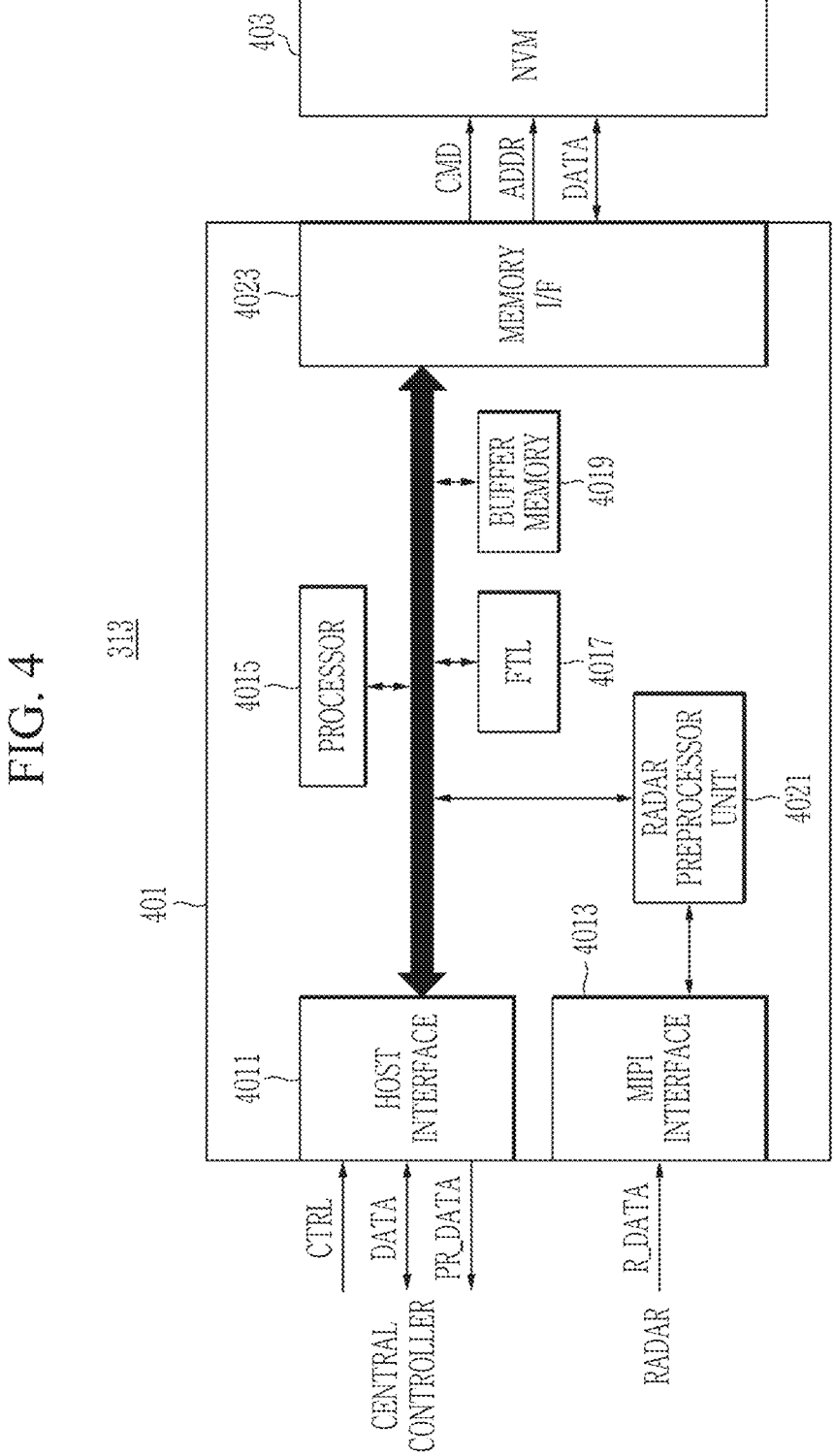
FIG. 4 shows a configuration of a storage device according to at least one embodiment.

FIG. 3 shows a partial configuration of a vehicle according to at least one embodiment. FIG. 4 shows a configuration of a storage device according to at least one embodiment.

As shown in FIG. 3, the sensor system 30 may include RADAR sensors 305, a central controller 309, and a storage device 313. The vehicle may include the sensor system 30. Although not shown in FIG. 3, the sensor system 30 may further include a LIDAR sensor and/or an image sensor.

The RADAR sensors 305 may transmit corresponding RADAR raw data (R_DATA) to the storage device 313.

For example, a first RADAR sensor 305a may transmit first RADAR raw data (R_DATAa) to the storage device 313. For example, the first RADAR sensor 305a may be installed on a first position of the vehicle. The first RADAR sensor 305a may transmit a RADAR transmitting signal to the object disposed in a direction in which the first RADAR sensor 305a faces on the first position, and may receive a RADAR receiving signal reflected and returned to the object. The direction in which the first RADAR sensor 305a faces may be the direction in which the RADAR transmitting signal of the first RADAR sensor 305a radiates.

The storage device 313 may receive RADAR raw data (R_DATA) from the RADAR sensors 305. The storage device 313 may generate RADAR data (PR_DATA) based on the received RADAR raw data (R_DATA). The storage device 313 may transmit the RADAR data (PR_DATA) to the central controller 309. The central controller 309 may obtain position information and velocity information on the object based on the received RADAR data (PR_DATA).

The storage device 313 may store and/or process data (DATA) in response to the control signal (CTRL) provided by the central controller 309.

Referring to FIG. 4 together, the storage device 313 may include a storage controller 401 and a non-volatile memory 403.

The storage controller 401 may control an operation of the storage device 313. For example, the storage controller 401 may provide addresses (ADDR), commands (CMD), etc., to the non-volatile memory 403 in response to the control signal (CTRL) received from the central controller 309. That is, the storage controller 401 may provide signals to the non-volatile memory 403 to write data to the non-volatile memory 403 or read data from the non-volatile memory 403. The storage controller 401 and the non-volatile memory 403 may transmit/receive the data (DATA) to/from each other.

The non-volatile memory 403 may include dies or chips including a memory cell array. For example, the non-volatile memory 403 may include chips, and the chips may respectively include dies. In at least one embodiment, the non-volatile memory 403 may include channels respectively including chips. The non-volatile memory 403 may be (and/or include) a computer readable media that retains stored data even after power is removed. The computer readable media may be, for example, a non-transitory non-volatile computer readable media. The term "non-transitory," as used herein, is a description of the medium itself (e.g., as tangible, and not a signal) as opposed to a limitation on data storage persistency (e.g., RAM vs. ROM).

For example, the non-volatile memory 403 may include a NAND flash memory. In another embodiment, the non-volatile memory 403 may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), and a ferroelectric random access memory (FRAM), or memories that are similar to the same. In the present disclosure, the non-volatile memory 403 will now be assumed to be a NAND flash memory device.

The storage controller 401 may include a processor 4015, a flash translation layer (FTL) 4017, a buffer memory 4019, a RADAR pre-processor 4021, a host interface 4011, a mobile industry processor interface (MIPI) interface 4013, and a memory interface 4023.

The processor 4015 may be configured to control a general operation of the storage controller 401. The processor 4015 may control the storage controller 401 by driving firmware loaded on the FTL 4017. In at least one embodiment, the processor 4015 may include a central processing unit (CPU), a controller, and an application specific integrated circuit (ASIC).

The processor 4015 may drive various types of firmware or software driven by the storage controller 401. The processor 4015 may use the buffer memory 4019 as an operating memory of the processor 4015. The processor 4015 may also use the non-volatile memory 403 as an operating memory of the processor 4015.

For example, the processor 4015 may control a data read operation from the non-volatile memory 403 and a data program operation to the non-volatile memory 403 by performing firmware.

The host interface 4011 may be configured to transmit/receive packets to/from the central controller 309. The packets transmitted to the host interface 4011 from the central controller 309 may include commands, or data to be written to the non-volatile memory 403. The packets transmitted to the central controller 309 from the host interface 4011 may include responses to the commands or data read from the non-volatile memory 403.

The MIPI interface 4013 may be configured to receive the RADAR raw data (R_DATA) from the RADAR sensors 305.

The memory interface 4023 may provide transmission/receiving of signals to/from the non-volatile memory 403. The memory interface 4023 may transmit commands and control signals together with the data to be written to the non-volatile memory 403 to the non-volatile memory 403 or may receive the read data from the non-volatile memory 403. The memory interface 4023 may be realized to observe the standard such as the Toggle or ONFI.

The FTL 4017 may include firmware or software for managing data write, data read, and/or sub-block and/or block erase operation of the non-volatile memory 403. The firmware of the FTL 4017 may be performed and/or enabled by the processor 4015. In at least one embodiment, the FTL 4017 may be (and/or include) e.g., hardware automation circuits for performing various maintenance and management operations. For example, the FTL 4017 may perform various functions such as address mapping, wear-leveling, or garbage collection.

The FTL 4017 may perform an address mapping operation for changing a logical address received from the central controller 309 into a physical address for storing data in the non-volatile memory 403. For example, the FTL 4017 may map the logical address of the central controller 309 and the physical address of the non-volatile memory 403 by using an address mapping table. The address mapping operation may be an operation for converting between the logical address managed by the central controller 309 and the physical address of the non-volatile memory 403 or mapping the same.

The buffer memory 4019 may store instructions and data executed by processed by the storage controller 401. The buffer memory 4019 may temporarily store the data stored in the non-volatile memory 403 or data to be stored.

The buffer memory 4019 may be (and/or include) a computer readable media. The computer readable media of the buffer memory 4019 may be, for example, a non-transitory volatile computer readable media. For example, the buffer memory 4019 may include a volatile memory (e.g., a dynamic random access memory (DRAM) and/or a static RAM (SRAM)). However, without being limited thereto, the buffer memory 4019 may be realized with various types of non-volatile memories including resistive non-volatile memories such as a magnetic RAM (MRAM), a phase change random access memory (PRAM), or a resistive RAM (ReRAM), and a flash memory, a nano floating gate memory (NFGM), a polymer random access memory (PoRAM), a ferroelectric random access memory (FRAM), and/or the like.

FIG. 4 shows that the buffer memory 4019 is installed inside the storage controller 401, the present disclosure is not limited thereto, and the buffer memory 4019 may be installed outside the storage controller 401.

The RADAR pre-processor 4021 may receive RADAR raw data (R_DATA) from the MIPI interface 4013. The RADAR pre-processor 4021 may be configured to perform a pre-processing operation on the RADAR raw data (R_DATA) to generate RADAR data (PR_DATA). The processor 4015 may transmit the RADAR data (PR_DATA) to the central controller 309 through the host interface 4011.

An operation for the RADAR pre-processor 4021 to generate the RADAR data (PR_DATA) will now be described with reference to FIG. 5, FIG. 6, and FIG. 7.

Figure 5:
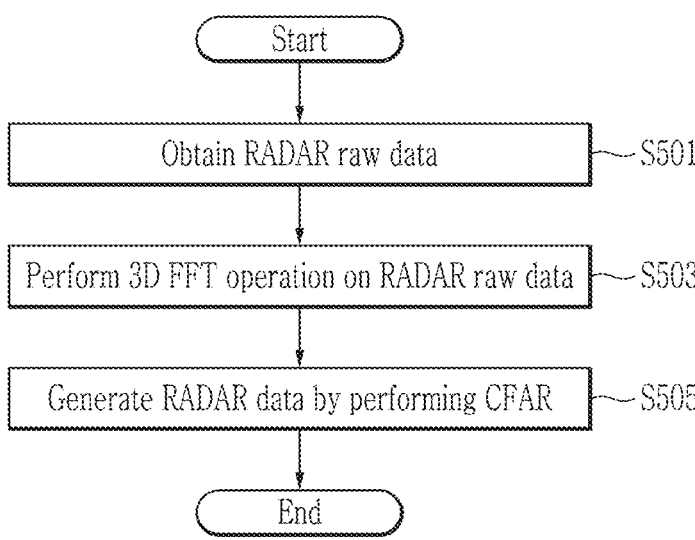
FIG. 5 shows an operation of a radar pre-processor according to at least one embodiment.
Figure 6:
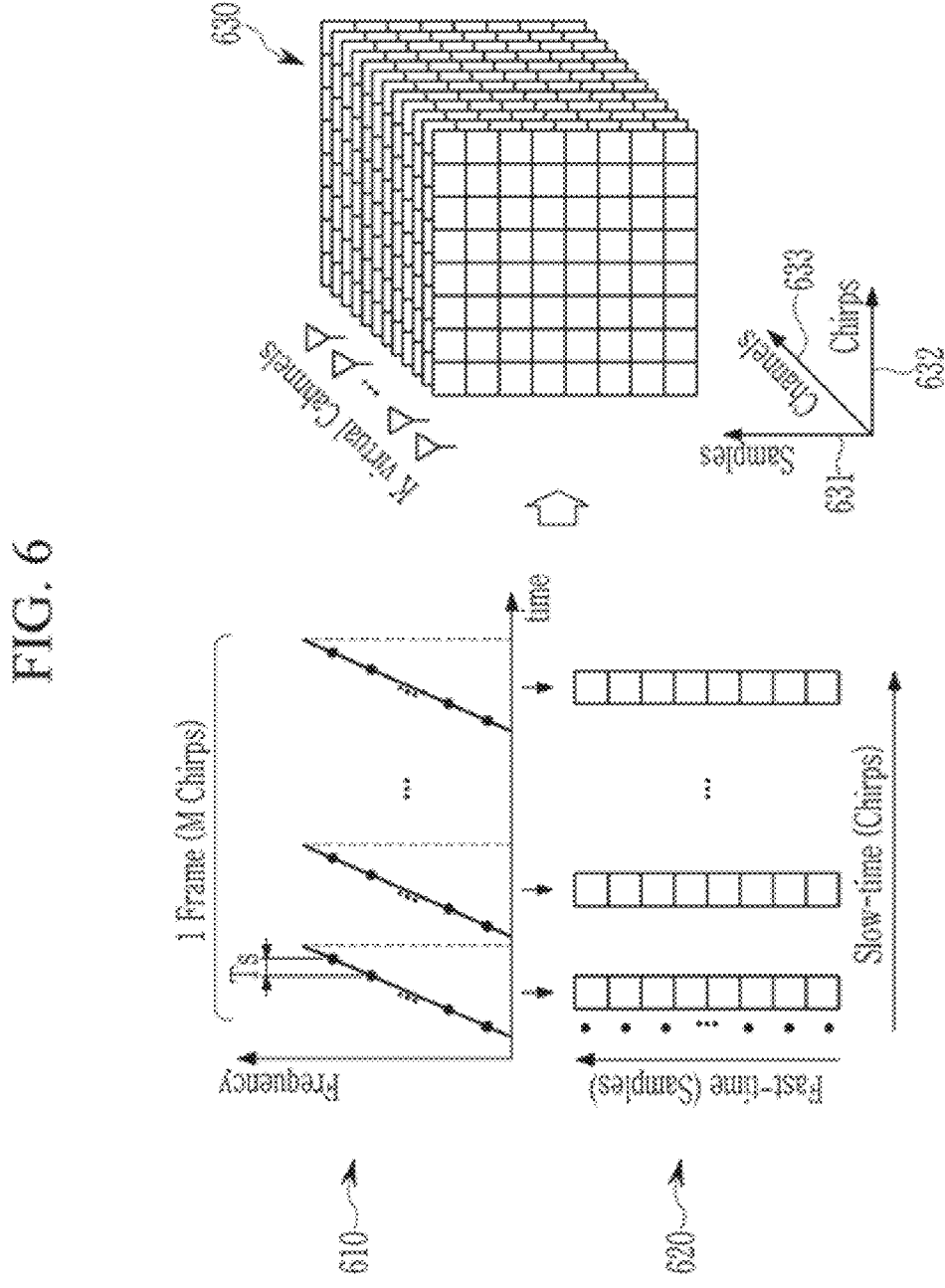
FIG. 6 and FIG. 7 show RADAR raw data according to at least one embodiment.

FIG. 5 shows an operation of a radar pre-processor according to at least one embodiment. FIG. 6 and FIG. 7 show RADAR raw data according to at least one embodiment.

Referring to FIG. 5, the RADAR pre-processor 4021 may obtain RADAR raw data (R_DATA) from the MIPI interface 4013 (S501). An example of operation S501 will now be described with reference to FIGS. 3-6 and FIG. 7.

The first RADAR sensor 305a may radiate M-numbered chirp signals for each scanning. The first RADAR sensor 305a may receive signals generated when the M-numbered chirp signals are reflected on the object. Here, M may be an integer that is equal to or greater than 1. It will be assumed that, regarding the first RADAR sensor 305a, K-numbered virtual antennas individually receive the RADAR receiving signals.

The first graph 610 shows RADAR transmitting signals with frequencies that change with respect to respective time flows of the M-numbered chirp signals. The RADAR signals of one frame may include chirp signals. One frame may correspond to one scanning. For example, the RADAR signals of one frame may include M-numbered chirp signals.

The RADAR signals of one frame may be analyzed with respect to a fast-time axis and a slow-time axis. The slow-time axis may be the time axis distinguished by the chirp signals, and the fast-time axis may be the time axis where frequency changes of the individual chirp signals may be observed.

Bit signals that correspond to the respective chirp signals may be sampled at N-numbered sampling points on the fast-time axis. The bit signals may be signals having frequency differences between transmitted signals and reflected signals of the corresponding transmitted signals. For example, the individual chirp signals may be radiated, may reach the object and may be reflected, and the reflected signal may be received by the RADAR sensor. A value of the bit signal between the transmitted chirp signal and the reflected signal may be sampled.

The second graph 620 shows a data cube including sample values obtained by sampling the bit signals.

The bit signals that correspond to the respective chirp signals included in the RADAR signal of the first graph 610 may be sampled at sampling intervals $T_S$. For example, N-numbered sample values may be obtained from the bit signal that corresponds to one chirp signal. The RADAR transmitting signal M-numbered chirp signals per frame, and the K-numbered virtual antennas individually receive the RADAR receiving signals, thereby obtaining (N×M×K)-numbered sample values. In at least one embodiment, the RADAR raw data (R_DATA) may be sample values of the RADAR receiving signal.

Referring back to FIG. 5, the RADAR pre-processor 4021 may perform a 3D fast Fourier transform (FFT) operation on the RADAR raw data (R_DATA) (S503).

For example, the RADAR pre-processor 4021 may arrange the RADAR raw data (R_DATA) according to K-numbered virtual antennas to configure them as a 3-dimensional (3D) first data cube 630. The first RADAR sensor 305a includes channels so the RADAR pre-processor 4021 may configure the data cube 620 including sample values as the 3D first data cube 630 formed in the N×M×K dimension along a sample axis 631, a chirp axis 632, and a channel axis 633. For example, the sample axis 631 may react to a time until an arbitrary electromagnetic wave is transmitted, and is then received by the RADAR sensor, the chirp axis 632 may react to changes among the chirp signals transmitted for one scanning, and the channel axis 633 may react to changes of the chirp signals received among the virtual antennas.

The 3D FFT operation may include a distance FFT operation and a Doppler FFT operation.

The distance FFT operation may be an operation for obtaining a distance value to the object by applying a FFT operation to a period of time from a time of radiating the RADAR transmitting signal to the RADAR raw data (R_DATA) to a time of receiving a reflected signal that is reflected on the object. In at least one embodiment, the RADAR pre-processor 4021 may estimate an angle that corresponds to an arrival direction of the RADAR receiving signal reflected from the object according to an operation of estimating an angle of arrival. For example, the RADAR pre-processor 4021 may estimate the angle of arrival by applying a multiple signal classification (MUSIC) algorithm, a Bartlett algorithm, a minimum variance distortionless response (MVDR) algorithm, a digital beam forming (DBF), an estimation of signal parameter via rotational invariance techniques (ESPIRT), and/or the like.

The Doppler FFT may be an operation of estimating a radial velocity (e.g., Doppler velocity) of the RADAR raw data (R_DATA) from the signal change among the chirp signals with respect to a Doppler axis. The RADAR pre-processor 4021 may obtain the radial velocity of the corresponding distance and the corresponding angle by performing a FFT operation on the signal changes among the chirp signals at an arbitrary distance and an arbitrary angle.

Figure 7:
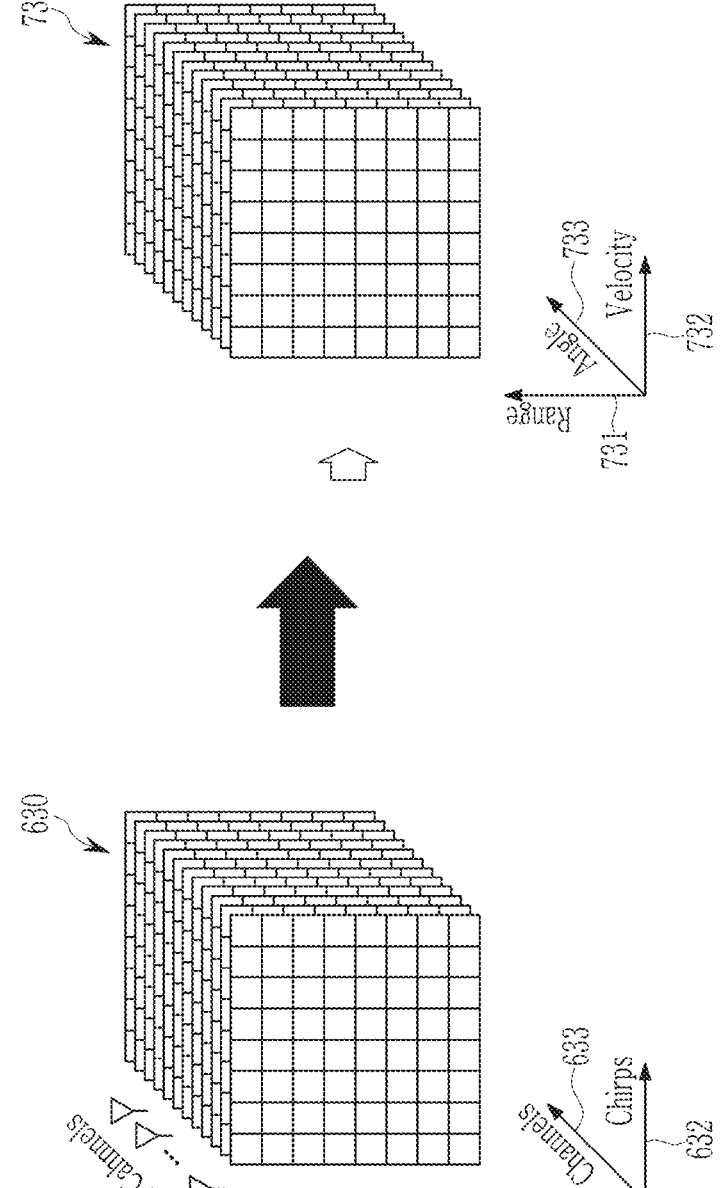

Referring to FIG. 7, the RADAR pre-processor 4021 may perform a 3D FFT on the RADAR raw data (R_DATA) to convert the first data cube 630 into a second data cube 730. For example, the first data cube 630 may be configured as the second data cube 730 with respect to a range axis 731, a velocity axis 732, and an angle axis 733. For example, the angle axis 733 may be an axis relating to an azimuth angle or an elevation angle. FIG. 7 shows that the second data cube 730 is converted with respect to the range axis, the velocity axis, and the angle axis, the present disclosure is not limited thereto, and the second data cube 730 may also be converted into the range axis, the radial velocity or the Doppler axis, and the channel axis by the 3D FFT operation. The radial velocity may represent a relative velocity of a target when the RADAR sensor sees the target.

Referring to back FIG. 5, the RADAR pre-processor 4021 may generate RADAR data (PR_DATA) (which also be referred to as pre-processed RADAR data) by performing a constant false alarm rate (CFAR) method (S505).

The CFAR method is a thresholding method for adaptively setting a threshold for detecting the target to suppress false alarms on the target.

The RADAR pre-processor 4021 may perform a CFAR method on the second data cube 730. In detail, the RADAR pre-processor 4021 may apply a sliding window algorithm for moving in a range of a predetermined length and finding a value that fits a condition to the second data cube 730. The RADAR pre-processor 4021 may set the threshold value based on the result of applying the sliding window to the second data cube 730, and may detect the cell that corresponds to a peak that is greater than the threshold value as the target. For example, the sliding window may include cells under test (CUT) and peripheral cells. In this instance, the threshold value may be determined by using signal intensity (e.g., noise floor, etc.,) of the peripheral cells.

FIG. 4 shows that one storage device 313 includes one non-volatile memory 403, the present disclosure is not limited thereto, and the storage device 313 may include one or more non-volatile memories.

Figure 8:
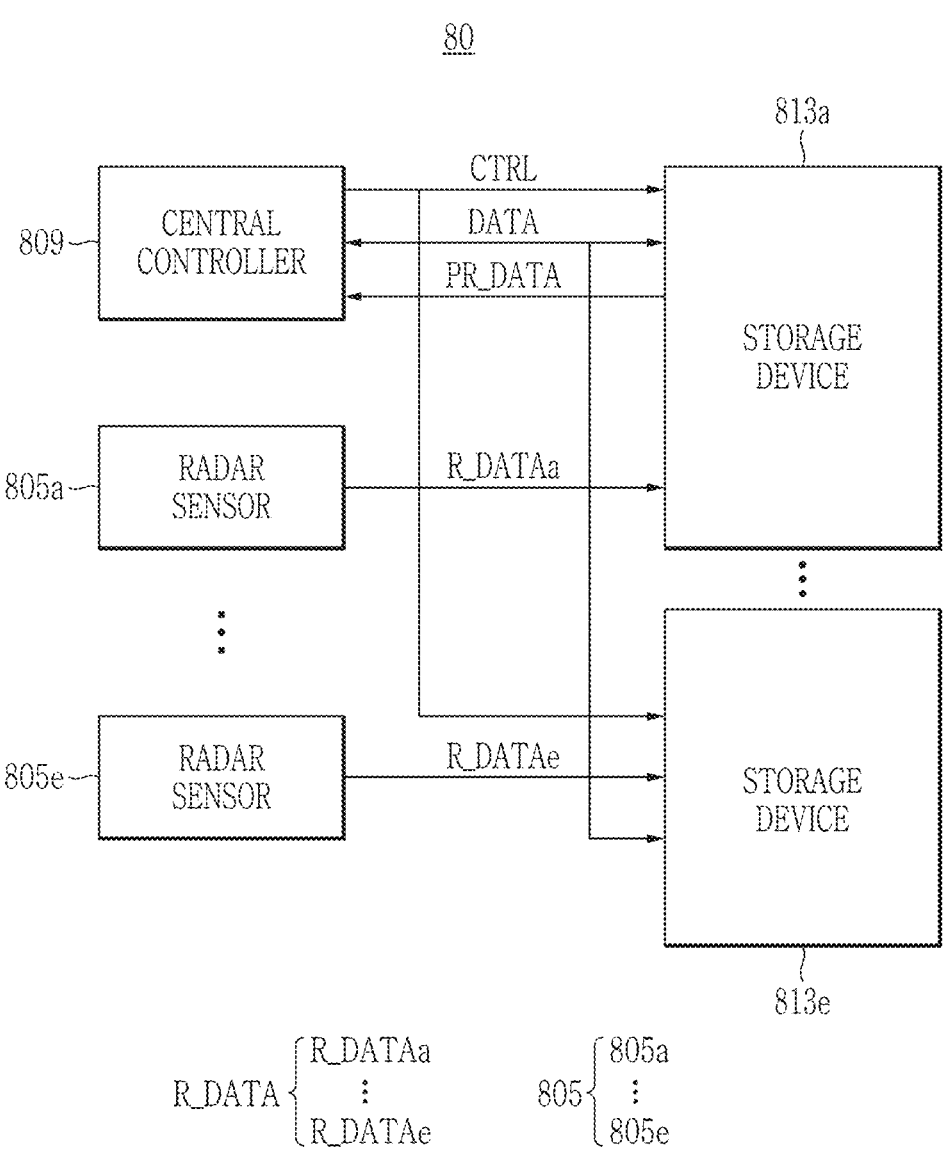
FIG. 8 shows a partial configuration of a vehicle according to at least one embodiment.

FIG. 8 shows a partial configuration of a vehicle according to at least one embodiment.

The sensor system 80 may include RADAR sensors 805, a central controller 809, and storage devices 813. The vehicle may include a sensor system 80. Although not shown in FIG. 8, the sensor system 80 may further include a LIDAR sensor and/or an image sensor.

The RADAR sensors 805 may transmit the generated RADAR raw data (R_DATA) to the corresponding storage device 813.

In detail, the first RADAR sensor 805a may transmit first RADAR data (R_DATAa) to the first storage device 813a. For example, the first RADAR sensor 805a may be installed on a first position of the vehicle. The first RADAR sensor 805a may transmit a RADAR transmitting signal to the object disposed in a direction in which the first RADAR sensor 805a faces on the first position, and may receive the RADAR receiving signal reflected and returned from the object. The direction in which the first RADAR sensor 805a may be the direction in which the RADAR transmitting signal of the first RADAR sensor 805a radiates.

The fifth RADAR sensor 805e may transmit fifth RADAR data (R_DATAe) to the fifth storage device 813e. For example, the fifth RADAR sensor 805e may be installed on a fifth position of the vehicle. The fifth RADAR sensor 805e may transmit the RADAR transmitting signal to the object disposed in the direction in which the fifth RADAR sensor 805e faces on the fifth position, and may receive the RADAR receiving signal reflected and returned from the object. The direction in which the fifth RADAR sensor 805e faces may be the direction in which the RADAR transmitting signal of the fifth RADAR sensor 805e radiates.

The storage devices 813 may receive the RADAR raw data (R_DATA) from the corresponding RADAR sensor from among the RADAR sensors 805. The storage devices 813 may generate corresponding RADAR data (PR_DATA) based on the received RADAR raw data (R_DATA). The storage device 813 may transmit the RADAR data (PR_DATA) to the central controller 809. The central controller 809 may obtain position information and velocity information on the object based on the received RADAR data (PR_DATA).

The storage devices 813 may store or process the data (DATA) in response to the control signal (CTRL) from the central controller 809.

Figure 9:
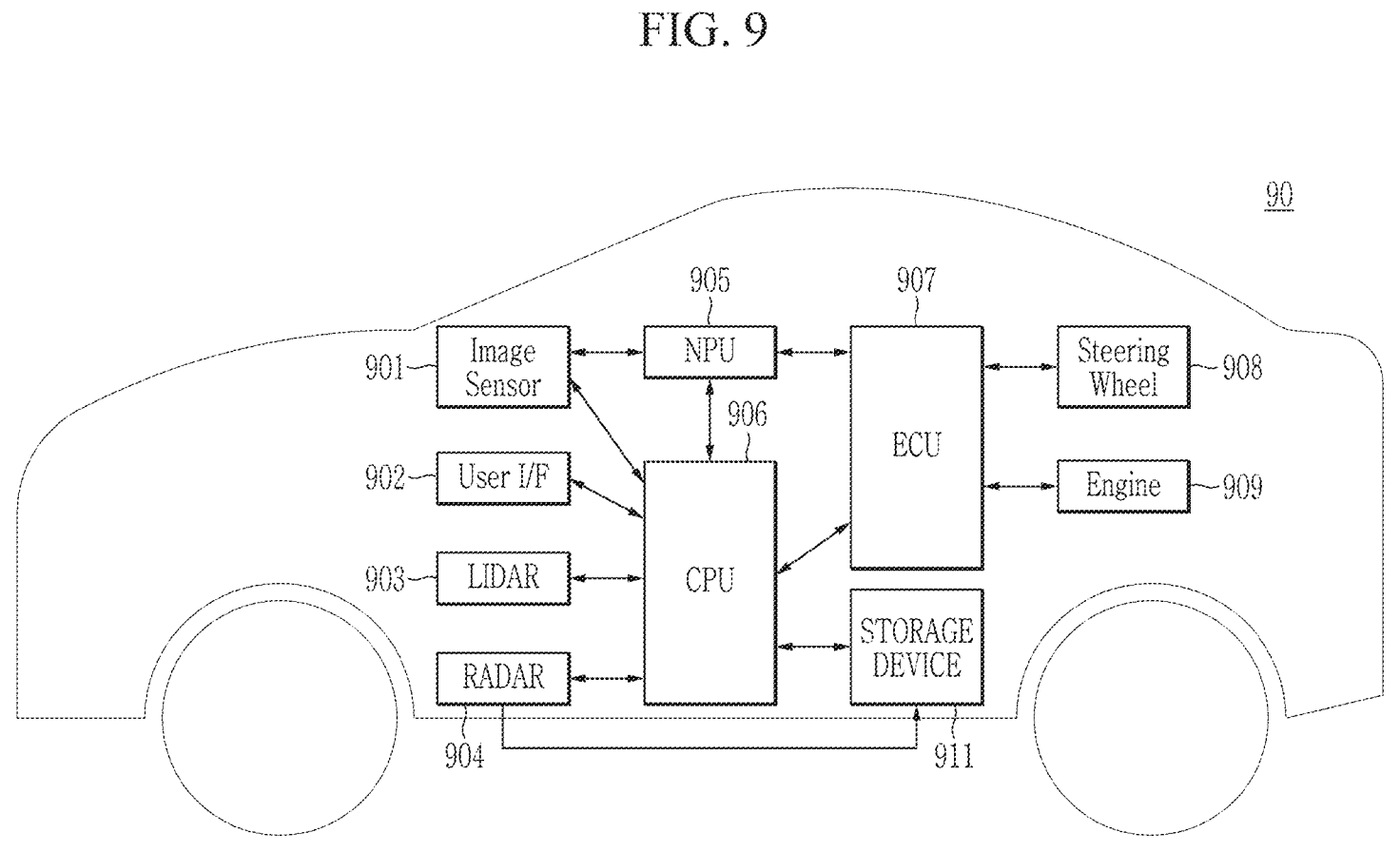

FIG. 9 shows a block diagram of a vehicle according to at least one embodiment.

As shown in FIG. 9, the vehicle 90 may include an image sensor 901, a user interface 902, a light detection and ranging (LIDAR) sensor 903, a radio detection and ranging (RADAR) sensor 904, a neural processing unit (NPU) 905, a CPU 906, an ECU 907, and a storage device 911, and the ECU 907 may receive a steering angle of the vehicle and a velocity of the vehicle from a steering wheel 908 and an engine 909. Although not shown, the vehicle 90 may further include a communication module, an input/output module, a security module, and a power control device, and may further include various types of control devices.

Here, the sensors (e.g., the image sensor 901, the LIDAR sensor 903, and/or the RADAR sensor 904) and the storage device 911 may be the sensors and storage device described with reference to FIG. 2 to FIG. 8.

In at least one embodiment, the vehicle 90 may detect objects by using information on external environments obtained through the sensors (e.g., the image sensor 901, the LIDAR sensor 903, and/or the RADAR sensor 904). The sensors 901, 903, and 904 may detect the objects, may measure distance to the objects, and may transmit data to the processors (e.g., the CPU 906, the NPU 905, and the ECU 907). A time of flight (ToF) sensor, an ultrasonic wave sensor, an infrared sensor, a magnetic sensor, a position sensor (e.g., GPS), an acceleration sensor, a pressure sensor, a temperature/humidity sensor, a proximity sensor, and a gyroscope sensor may also be used in addition to the above-noted sensors.

The image sensor 901 may provide an image or light sensing function, for example, it may be a complementary metal-oxide-semiconductor (CMOS) image sensor. The image sensor 901 may obtain image or visual information on the objects. For example, the image sensor 901 may be attached to a front of the vehicle to capture driving images or may measure the distance to the object disposed at the front of the vehicle. The position to which the image sensor 901 is attached is not limited thereto, and the image sensor 901 may be attached to many positions to obtain information on the object.

The image sensor 901 may photograph surrounding environments of the vehicle 90. The vehicle 90 may include at least two image sensors to photograph the surroundings of the vehicle in the entire directions of 360 degrees. In at least one embodiment, the image sensor 901 may include a wide-angle lens. In at least one embodiment, four image sensors disposed on the front, rear, left-hand side, and right-hand side of the vehicle may be included in the vehicle 90, and without being limited thereto, vehicle surrounding environments may be photographed by using one image sensor 901. The image sensor 901 may continuously provide information on the vehicle surrounding environments to the vehicle 90 by continuously photographing the vehicle surrounding environments.

The image sensed by the image sensor 901 may be processed by the CPU 906 and/or the NPU 905. The CPU 906 may detect the object by processing the sensed image according to a motion-based method, and the NPU 905 may detect the object by processing the sensed image according to a shape-based method. The image sensor 901 may be attached to the front of the vehicle to sense external environments of the front of the vehicle, and without being limited thereto, it may be attached to various surfaces of the vehicle to sense the external environments.

The user interface 902 may include various types of electronic devices and mechanical devices included in a driver's seat or a passenger seat such as a dashboard of the vehicle, a display for indicating driving information, a GPS, and an air conditioning device.

The LIDAR sensor 903 may emit laser pulses, may receive laser beams reflected from the target object, and may measure the distance to the object. The LIDAR sensor 903 may include a laser beam device, a scanner, a receiver, and/or a position checking system. The laser beams may use light in the wavelength band of about 600 to 1000 nm (nanometers), and may be different according to uses. The scanner may quickly obtain information on the surrounding environments by scanning the sensed surrounding environments, and there may be various types of scanners using mirrors. The receiver may receive the laser pulses reflected on the target object, may sense photons from the laser pulses, and may amplify them. The position checking system may check a position coordinate and a direction of the device in which a receiver is installed to realize 3D images. The LIDAR sensor 903 and the RADAR sensor 904 may be distinguished by valid measured distances.

The RADAR sensor 904 may emit electromagnetic waves, may receive the electromagnetic wave reflected from the target object, and may measure the distance to the object, or may identify the object and may measure the position and the moving rates of the object. The RADAR sensor 904 may include a transmitter and a receiver. The transmitter may generate electromagnetic waves and may output them, and the receiver may receive echo waves reflected from the target object and may process signals. The RADAR sensor 904 may perform transmission and receiving through one antenna, but is not limited thereto. A frequency bandwidth of the electromagnetic waves used by the RADAR sensor 904 may be that of radio waves or microwaves, and may be changed depending on purposes. In at least one embodiment, the LIDAR sensor 903 and the RADAR sensor 904 may be attached to the vehicle to assist in determining a relative positional relationship between the vehicle and the objects of interest.

The NPU 905 may receive input data, may perform an operation using an artificial neural network, and may provide output data based on an operation result. The NPU 905 may be a processor optimized for simultaneous matrix operations, may process multiple operations in real-time, and may derive an optimal value by a self-learning based on accumulated data. The NPU 905 may be optimized for the simultaneous matrix operations to process multiple operations in real-time, and may perform a self-learning based on the accumulated data to deduce a local-maximum value of current driving parameters.

In at least one embodiment, the NPU 905 may be processor that is specific to execution of a deep-learning algorithm. For example, the NPU 905 may be a specific processor to the execution of a deep-learning algorithm. For example, the NPU 905 may process the operations based on various types of networks such as the convolution neural network (CNN), the region with convolution neural network (R-CNN), the region proposal network (RPN), the recurrent neural network (RNN), the fully convolutional network, the long short-term memory (LSTM) network, or the classification network. However, the NPU is not limited thereto, and may perform various types of operational processing based on trainable structures, e.g., with training data, such as an artificial neural network, a decision tree, a support vector machine, a Bayesian network, a genetic algorithm, and/or the like. Non-limiting examples of the trainable structure may include the convolution neural network (CNN), a generative adversarial network (GAN), an artificial neural network (ANN), the region with convolution neural network (R-CNN), the region proposal network (RPN), the recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and/or the like.

The NPU 905 may receive driving images from the image sensor 901, and may perform a shape-based object detection based on the driving images. The NPU 905 may extract features of the objects and may self-learn based on the accumulated data to distinguish respective objects from the driving image. For example, the NPU 905 may extract objects that are the reference of determination at the time of driving, such as vehicles, pedestrians, traffic lights, and lanes in the single driving image based on the features determined using the accumulated data as learning materials. In at least one embodiment, the NPU 905 may also determine a speed and/or angle for the vehicle 90 based on accumulated data. For example, the NPU 905 may determine a speed and/or angle to avoid an obstacle, transition between lanes, to maintain a distance, and/or the like.

The CPU 906 may be configured to control a general operation of the vehicle 90. The CPU 906 may include a single core or a multi-core. The CPU 906 may process or perform programs and/or data stored in the memory. For example, the CPU 906 may control functions of the NPU 905 and the ECU 907 by performing the programs stored in the memory.

The CPU 906 may obtain a steering angle and a vehicle velocity from the ECU 907. The steering angle may be determined by manipulating the steering wheel 908 by a driver, may be processed by the ECU 907 for managing an operation of a steering control device, and may be provided to the CPU 906. The vehicle velocity may be measured based on at least one of pedaling of the driver (e.g., an operation of the accelerator), a rotation velocity of the engine 909, and a wheel velocity measured by a wheel sensor, it may be processed by the ECU 907 for controlling the velocity of the vehicle, and it may be provided to the CPU 906.

Further, the CPU 906 may determine the relative position relationship between the vehicle and the surrounding objects (e.g., other vehicles, pedestrians, obstacles, bicycles, lanes, road signs, curbs, guard rails, street trees, and street lamps, and/or the like), and may issue an instruction for maintaining the number of revolutions of the engine 909 for cruising to maintain a distance from the surrounding vehicles according to a predetermined driving plan, and/or may issue an instruction for adjusting the steering wheel 908 to the left or right to change the steering angle, to perform an evasive maneuver when the vehicle and the surrounding vehicle are within a threshold distance, or when the surrounding vehicle cuts in. Thereby, the CPU 906 may use the data acquired by the sensors (e.g., the image sensor 901, the LIDAR sensor 903, and/or the RADAR sensor 904) and/or processed by the storage device 911 to control the operation of the vehicle 90. FIG. 9 shows that the steering wheel 908 and the engine 909 relate to the steering angle and the vehicle velocity, and without being limited thereto, the steering angle and the vehicle velocity may be determined according to various elements of the vehicle.

Thus, the CPU 906 may perform an object detection on the driving image according to a motion-based method. The motion-based method may determine relative motions by detecting a degree of motion of the object with respect to time. The driving image may be continuously obtained for respective frames through the image sensor 901. For example, the respective frames may be photographed at the rate of 60 fps (frames per second) so the CPU 906 may detect the motions among the image frames obtained every $\frac{1}{60}$ seconds with respect to time. The motion-based method may include an optical flow representing a distribution of motion vectors of the object.

The CPU 906 may use the distance to the object obtained from the LIDAR sensor 903 in an assisting way in addition to the image sensor 901 to stably maintain the driving state of the vehicle. To be described later, the CPU 906 may maintain the driving state of the vehicle further based on the RADAR data received from the storage device 911. Further, the CPU 906 may issue an instruction for adjusting internal/ external states of the vehicle according to a manipulation of the user interface 902 by the driver.

The ECU 907 may be an electronic control device provided to control entire/partial operations of the vehicle. The ECU 907 may control an operation of a combustion engine, an operation of at least one electric motor, and an operation of the vehicle according to parameters of the vehicles caused by a semi-automatic gearbox (SAGB) or an automatic gearbox (AGB), and other driver's controls, through a controller area network (CAN) multiplexing bus.

The ECU 907 may electronically control an engine of the vehicle, an actuator of the steering control device, a transmission control system, an anti-lock brake system, and an air-bag control system by use of a computer, may provide the vehicle velocity to the vehicle 90 based on a rotation velocity of an engine or a wheel velocity measured by a wheel sensor, and may provide a steering angle of the vehicle to the vehicle 90 from the steering control device.

According to the shown embodiment, the ECU 907 may adjust the states of the steering wheel 908 and the engine 909 based on the instructions issued by the CPU 906 and/or the NPU 905. In at least one embodiment, the ECU 907 may accelerate or decelerate the vehicle in response to the commands issued by the CPU 906 and the NPU 905, and may provide a signal for increasing or decreasing a rotational velocity to the engine 909 for the purpose of acceleration or deceleration. The ECU 907 may adjust the steering wheel 908 to the left or right for an evasive maneuver when the distance to a surrounding vehicle is within a threshold distance according to a predetermined driving plan or when a surrounding vehicle cuts in.

The ECU 907 shows to be mounted in the vehicle in a separate way from the CPU 906, and without being limited thereto, a vehicle control function of the ECU 907 may be performed together while included in the CPU 906, and in this case, the CPU 906 may be understood to have at least two cores (or a multi-core). FIG. 9 shows that the ECU 907 is separated from the CPU 906, and without being limited thereto, it may be disposed in the CPU 906.

The storage device 911 may receive the RADAR raw data from the RADAR sensor 904. In at least one embodiment, the storage device 911 may store the RADAR raw data. The storage device 911 may pre-process the RADAR raw data to generate RADAR data having a less bandwidth than the RADAR raw data. The storage device 911 may transmit the RADAR data to the CPU 906.

The CPU 906 may receive the RADAR data from the storage device 911, and may obtain information on the object around the vehicle based on the RADAR data. When the CPU 906 processes information on the object around the vehicle based on the RADAR data, an amount of information to be processed may be reduced compared to the case when the information on the object around the vehicle is processed based on the RADAR raw data (e.g., the burden on the CPU 906 may be reduced) so the processing rate may increase.

Although not shown in FIG. 9, the vehicle 90 may further include a communication module. The communication module may transmit data to the outside of the vehicle 90 and/or may receive data from the outside thereof. For example, the communication module may communicate with external objects outside the vehicle 90. In this case, the communication module may perform communication in the vehicle to everything (V2X) way. For example, the communication module may perform communication by the vehicle to vehicle (V2V), vehicle to infra (V2I), vehicle to pedestrian (V2P), and vehicle to nomadic devices (V2N) methods. However, the communication module is not limited thereto, may transmit and receive data in various well-known communication manners. For example, the communication module may perform the communication by, for example, 3G, 4G (LTE), 5G, Wi-Fi, Bluetooth low energy (BLE), Zigbee, near field communication (NFC), ultrasonic communication methods, etc., and may perform both short-range and long-range communication.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A vehicle storage device comprising:
a non-volatile memory configured to store first data; and
a storage controller,
wherein the storage controller comprises:
a first interface configured to receive the first data, the first data generated by digitally converting an analog signal transmitted to and reflected by an object outside a vehicle;
a radar pre-processor configured to generate second data by performing a pre-processing operation on the first data; and
a second interface configured to output the second data.

2. The vehicle storage device of claim 1, wherein the radar pre-processor is configured to perform the pre-processing operation such that the pre-processing operation includes a distance fast Fourier transform (FFT) operation, and
wherein the distance FFT operation includes applying an FFT operation to the first data for a period of time between transmitting and receiving the analog signal.

3. The vehicle storage device of claim 2, wherein the analog signal is generated by frequency-modulating a chirp signal of which an amplitude linearly changes with respect to time, and
the radar pre-processor is configured to perform the pre-processing operation such that the pre-processing operation includes a Doppler FFT operation such that a Doppler velocity is determined based on a signal change of the chirp signal with respect to a Doppler axis on the first data.

4. The vehicle storage device of claim 3, wherein the radar pre-processor is configured to perform the pre-processing operation such that the pre-processing operation includes a constant false alarm rate (CFAR) operation, the CFAR operation including
applying a sliding window to the first data to set a threshold value, and
detecting a target based on the threshold value.

5. The vehicle storage device of claim 1, wherein the radar pre-processor is configured to perform the pre-processing operation such that the pre-processing operation includes an operation of estimating an angle of arrival by applying at least one of a multiple signal classification (MUSIC) algorithm, a Bartlett algorithm, a minimum variance distortionless response (MVDR) algorithm, a digital beam forming (DBF), or an estimation of signal parameter via rotational invariance techniques (ESPIRT) to the first data.

6. The vehicle storage device of claim 1, wherein the second data includes point cloud data on the object.

7. The vehicle storage device of claim 1, wherein the first interface is a mobile industry processor interface (MIPI) interface.

8. A vehicle sensor system comprising:
at least one RADAR sensor configured to transmit a first signal to an object, and to generate first data based on a second signal reflected back from the object outside a vehicle;
a vehicle storage device comprising a non-volatile memory configured to store first data and a storage controller configured to receive the first data from the at least one RADAR, and to perform a pre-processing operation on the first data to generate second data; and
a central controller configured to obtain information on the object based on the second data.

9. The vehicle sensor system of claim 8, wherein the storage device is configured to perform the pre-processing operation such that the pre-processing operation includes a distance fast Fourier transform (FFT) operation, and
the distance FFT operation includes applying an FFT operation to the first data for a period of time between transmitting the first signal and receiving the second signal.

10. The vehicle sensor system of claim 9, wherein the at least one RADAR sensor is configured to generate the first signal by frequency-modulating a chirp signal of which an amplitude linearly changes with respect to time, and
the storage device is configured to perform the pre-processing operation such that the pre-processing operation includes a Doppler FFT operation such that a Doppler velocity is determined based on a signal change of the chirp signal with respect to a Doppler axis on the first data.

11. The vehicle sensor system of claim 10, wherein the storage device is configured to perform the pre-processing operation such that the pre-processing operation includes a constant false alarm rate (CFAR) operation for applying a sliding window to the first data to set a threshold value, and detecting a target based on the threshold value.

12. The vehicle sensor system of claim 8, wherein the storage device is configured to perform the pre-processing operation such that the pre-processing operation includes an operation of estimating an angle of arrival by applying at least one of a multiple signal classification (MUSIC) algorithm, a Bartlett algorithm, a MVDR algorithm, a digital beam forming (DBF), or an estimation of signal parameter via rotational invariance techniques (ESPIRT) to the first data.

13. The vehicle sensor system of claim 8, wherein the second data includes point cloud data on the object.

14. The vehicle sensor system of claim 8, wherein the storage device includes a mobile industry processor interface (MIPI) interface, and is connect to the at least one RADAR sensor through the MIPI interface.

15. The vehicle sensor system of claim 8, wherein the at least one RADAR sensor is included in a plurality of RADAR sensors disposed outside a vehicle, and
the plurality of RADAR sensors includes a front RADAR sensor disposed at a front of the vehicle configured to use a signal with a long wavelength as the first signal, and a lateral RADAR sensor disposed on a lateral side of the vehicle configured to use a signal with a short wavelength as the first signal.

16. The vehicle sensor system of claim 8, wherein the first data is generated by analog to digital converting the second signal, and
the sensor system is configured to store the first data in the storage device.

17. The vehicle sensor system of claim 8, further comprising:

a light detection and ranging (LIDAR) sensor configured to emit laser pulses to the object and receive laser beams reflected from the object to generate LIDAR data, wherein the central controller is further configured to obtain information on the object based on the LIDAR data.

18. The vehicle sensor system of claim 8, further comprising:

an image sensor configured to sense a field of view and generate image data on the object, wherein the central controller is further configured to obtain information on the object based on the image data.

19. A vehicle comprising:

a RADAR sensor configured to transmit a RADAR transmitting signal to an object outside a vehicle, to receive a reflected signal reflected back from the object, and to analog-to-digital convert the reflected signal to generate RADAR raw data;

a storage device comprising a non-volatile memory configured to store first data and a storage controller configured to store the RADAR raw data and to generate RADAR data by performing a pre-processing operation on the RADAR raw data;

a central controller configured to obtain information on the object based on the RADAR data; and an electronic control unit (ECU) configured to control driving of the vehicle based on information on the object.

20. The vehicle of claim 19, further comprising:

a LIDAR sensor configured to emit laser pulses to the object and to receive laser beams reflected from the object to generate LIDAR data; and an image sensor configured to sense a field of view outside the vehicle and generate image data on the object, wherein the central controller is further configured to obtain information on the object based on the LIDAR data and the image data.

\*     \*     \*     \*     \*